United States Patent [19]

DuBose et al.

[11] Patent Number: 5,751,152

[45] Date of Patent: May 12, 1998

[54] METHOD AND APPARATUS FOR CONCURRENTLY MEASURING NEAR END CROSSTALK AT TWO ENDS OF A CABLE

[75] Inventors: Richard G. DuBose, Scottsdale; Martin Teague, New River, both of Ariz.

[73] Assignee: Microtest, Inc., Phoenix, Ariz.

[21] Appl. No.: 647,572

[22] Filed: May 14, 1996

[51] Int. Cl.$^6$ .................................................. G01R 27/28
[52] U.S. Cl. ........................... 324/628; 324/684; 324/720
[58] Field of Search .................................. 324/628, 684, 324/720, 680, 679, 669, 672, 673; 455/78, 295; 370/6, 32; 379/415, 416, 417

[56] References Cited

U.S. PATENT DOCUMENTS

| | | | |
|---|---|---|---|
| 2,173,183 | 9/1939 | Schramm | 324/628 |
| 2,264,132 | 11/1941 | Flech, Jr. | 324/628 |
| 2,355,776 | 8/1944 | Benning | 324/628 |
| 5,502,391 | 3/1996 | Sciacero et al. | 324/628 |

OTHER PUBLICATIONS

Nov. '95, Link Testing In The Time Domain And Performance Advantages Over Swept Frequency Measurements by J.S. Bottman Koeman.

Sep. '95, Transmission Performance Specifications for Field Testing of Unshielded Twisted-Pair Cabling Systems.

*Primary Examiner*—Christine K. Oda
*Attorney, Agent, or Firm*—Meschkow & Gresham,P.L.C.; Lowell W. Gresham; Jordan M. Meschkow

[57] ABSTRACT

The apparatus includes a first transmitter for transmitting a first test signal from a first end of the cable and a second transmitter for transmitting a second test signal from a second end of the cable. The first test signal is transmitted on a first conductor pair at a first frequency and the second test signal is simultaneously transmitted on a second conductor pair at a second frequency. The apparatus also includes a first receiver for receiving a first coupled signal at the first end of the cable and a second receiver for simultaneously receiving a second coupled signal at the second end of the cable. The first coupled signal exhibits the first frequency and is received on a third conductor pair, while the second coupled signal exhibits the second frequency and is received on a fourth conductor pair. The transmit frequencies are offset such that interference and noise are not detected by the receivers as coupled signals.

20 Claims, 3 Drawing Sheets

METHOD AND APPARATUS FOR CONCURRENTLY MEASURING NEAR END CROSSTALK AT TWO ENDS OF A CABLE

FIELD OF THE INVENTION

The present invention relates generally to test equipment for data transmission cables. More specifically, the present invention relates to test equipment for measuring the near end cross talk between conducting elements in a multiconductor data transmission cable.

BACKGROUND OF THE INVENTION

High-speed data transmission cables are often an integral part of computer networks and telecommunications systems. For example, a local area network (LAN) typically includes a number of individual computers and peripheral devices that communicate with one another through data cables. LANs and other systems often employ multiconductor cables that are terminated with standard modular jacks or plugs. Common LAN cables include four unshielded twisted pair (UTP) conductors terminated with telephone-style eight-pin modular connectors.

The performance of telecommunications systems and computer networks can be affected by the quality of the interconnecting data transmission cables and connectors. Consequently, certification standards set forth minimum performance characteristics for data communication "links" (a link is commonly defined as a length of transmission cable in combination with the two terminating modular connectors). Near end crosstalk (NEXT) within a link creates unwanted noise in the conductor pairs, which causes data transmission errors and degrades the overall performance of the system. As such, certification standards may place a limitation on the amount of NEXT allowed over the operating frequency range of the particular link being tested.

NEXT is typically calculated by transmitting a signal on a first conductor pair and measuring the strength of the coupled signal that appears on a second conductor pair in the same link (the respective signals are transmitted and received at the same end of the link). Current standards specify that NEXT measurements must be repeated for a number of frequencies within a specified frequency range for the particular link under test. For example, Category 5 cables (used in LAN applications) are tested at hundreds of frequencies between about 1 MHz and 100 MHz. NEXT testing should be performed at both ends of the link under test because NEXT can be dependent on several factors that may vary from end to end, including the integrity of the terminal connections, the routing of the cable, and the amount of twist in the conductor pairs. Certification standards also call for testing all possible combinations of conductor pairs such that the worst case of NEXT can be determined.

Conventional NEXT test equipment performs swept frequency measurements from one link end followed by swept frequency measurements from the other link end. The two ends are tested separately in time to prevent test signals generated at one end of the link from coupling into the receiving conductor pair being tested at the other end. Unfortunately, the serial testing of the two link ends can take an undesirably long time to complete. When a large number of links must be tested (e.g., in a complex system or network having many components), technicians may spend an appreciable amount of time waiting as NEXT tests are conducted. Thus, conventional NEXT testing increases the cost and time typically associated with the installation of data communication cables.

SUMMARY OF THE INVENTION

Accordingly, it is an advantage of the present invention that an improved apparatus for measuring near end cross talk (NEXT) in a cable is provided.

Another advantage of the present invention is that an improved method for measuring NEXT in a cable is provided.

Another advantage of the present invention is that the NEXT measurement apparatus performs NEXT measurements for a data communications link in less time than conventional NEXT testing devices.

A further advantage is that the NEXT measurement apparatus is capable of simultaneously conducting NEXT measurements from both ends of a data communications link.

The above and other advantages of the present invention are carried out in one form by a method for measuring NEXT between a plurality of conducting elements in a multiconductor cable. The method involves transmitting a first test signal having a first frequency on one of the conducting elements and transmitting a second test signal having a second frequency on the same or a different one of the conducting elements. The first and second test signals are transmitted approximately simultaneously. The method also involves receiving a first coupled signal having the first frequency and receiving a second coupled signal having the second frequency. The first and second coupled signals are responsive to the first and second test signals, respectively.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
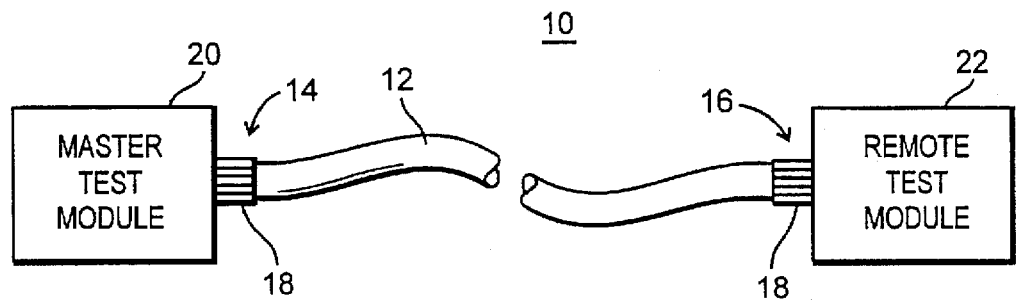
FIG. 1 shows an exemplary operating environment for an apparatus for measuring near end cross talk (NEXT) in a multiconductor cable.

Referring to FIG. 1, an exemplary operating environment for an apparatus 10 is illustrated. Apparatus 10 is configured to measure near end cross talk (NEXT) between conducting elements in a multiconductor cable 12 having a first end 14 and a second end 16. Nothing prevents apparatus 10 from additionally performing other tests on cable 12, e.g., attenuation tests, impedance tests, length measurements, or wire map tests.

For purposes of this description, cable 12 is configured as standard Category 5 unshielded twisted pair (UTP) cable. Category 5 cable is commonly used for computer applications such as local area networks (LANs). However, those skilled in the art will appreciate that the present invention can be adapted to accommodate a variety of different cable types.

Figure 2:
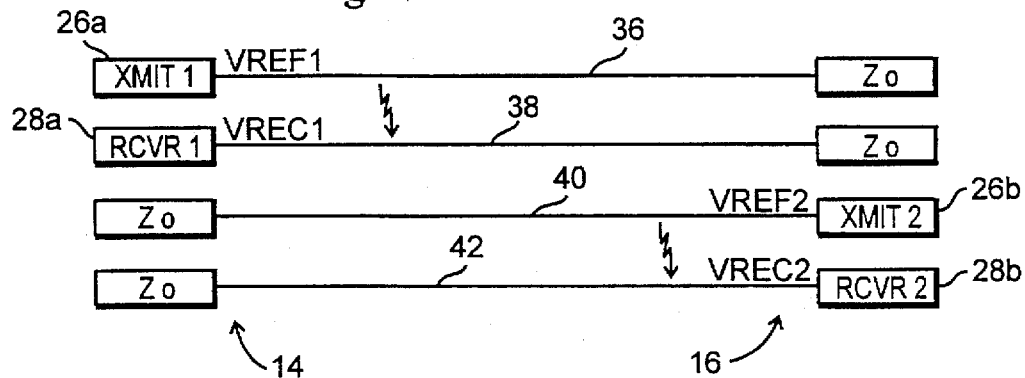
FIG. 2 is a schematic depiction of an exemplary testing configuration for the NEXT measurement apparatus.

Cable 12 preferably includes four conductor pairs realized by eight wires. The conductor pairs form conducting elements that carry differential signals between system components. FIG. 2 is a schematic depiction of cable 12 showing the four conductor pairs as simplified conducting elements. Although unshielded twisted pairs are preferably utilized in LAN applications, cable 12 can be configured with any suitable conducing elements. In accordance with conventional practices, first and second ends 14 and 16 are each terminated with a modular eight-pin connector 18. An assembly including a length of data transmission cable terminated with connectors is commonly referred to as a "link." However, for purposes of the following description, cable 12 may refer to the length of cable alone or the link assembly that includes the length of cable and connectors 18.

When testing cable 12, apparatus 10 is connected as shown in FIG. 1. Apparatus 10 preferably includes a first (or master) module 20 and a second (or remote) module 22. Master module 20 may include a user interface, a display element, connectors for peripheral devices, and other conventional test equipment features (not shown). In practice, master module 20 is connected to one end, e.g., first end 14, of cable 12 and remote module 22 is connected to the other end, e.g., second end 16, of cable 12. The user initiates, controls, and monitors testing at master module 20 after connecting remote module 22 to second end 16.

Figure 3:
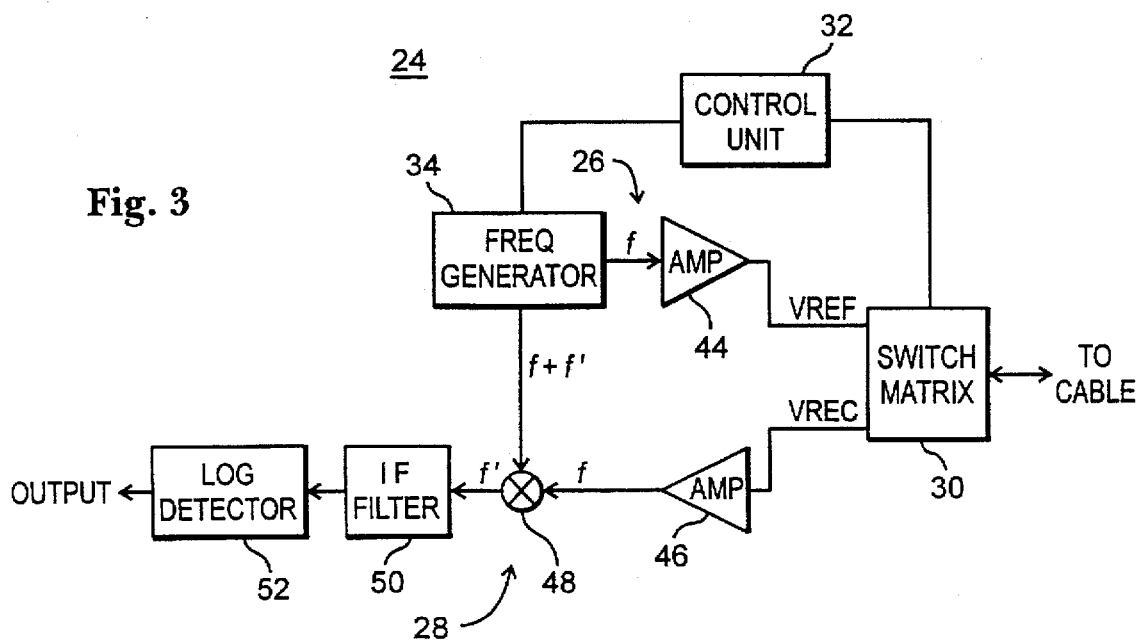
FIG. 3 is a simplified block diagram of a circuit utilized by the NEXT measurement apparatus.

FIG. 3 is a simplified block diagram of a circuit 24 utilized by apparatus 10. To facilitate simultaneous NEXT testing from both ends of cable 12, master module 20 and remote module 22 each includes circuit 24. In addition to circuit 24, master and remote modules 20 and 22 may include additional components configured to carry out any number of conventional cable tests. Circuit 24 generally includes a transmitter 26, a receiver 28, a switch matrix 30, and a control unit 32. For each test frequency, transmitter 26 generates a test signal (labeled VREF) for transmission on a first conductor pair and receiver 28 receives a coupled signal (labeled VREC) on a second conductor pair. The NEXT between the first and second conductor pairs is calculated as a measure of VREC relative to VREF.

Control unit 32 may include conventional memory elements (not shown) that store various programming instructions related to the processes described herein, and conventional microprocessor elements (not shown) that carry out the various processes and otherwise control the operation of apparatus 10. Control unit 32 is configured to control at least a frequency generator 34 and switch matrix 30.

Control unit 32 causes switch matrix 30 to select a transmit conductor pair and a receive conductor pair for a current NEXT measurement. For the exemplary test condition depicted in FIG. 2, VREF1 is impressed on a first conductor pair 36 and VREC1 is present on a second conductor pair 38. At the opposite end of cable 12, VREF2 is impressed on a third conductor pair 40 and VREC2 is present on a fourth conductor pair 42. After the NEXT measurements are completed for an initial conductor pair combination, switch matrix 30 selects a different combination of conductor pairs for subsequent testing by apparatus 10. For example, an alternate testing configuration may have VREF1 transmitted on second conductor pair 38, VREC1 received on third conductor pair 40, VREF2 transmitted on first conductor pair 36, and VREC2 received on fourth conductor pair 42. In a four conductor cable, all six combinations of two conductor pairs are tested for NEXT at each end.

Frequency generator 34 synthesizes signals utilized by transmitter 26 and receiver 28. In the preferred embodiment, frequency generator 34 produces square wave outputs, which are generally easier to digitally produce than pure sine wave outputs. Under the control of control unit 32, frequency generator 34 generates an output signal having a frequency (designated "f"). The output signal is amplified by an amplifier 44 to produce the VREF test signal. Transmitter 26 is coupled to switch matrix 30, which routes the test signal to the appropriate conductor pair under test. For Category 5 cable, NEXT is typically measured for each combination of conductor pairs at more than four hundred frequencies between about 1 MHz to about 100 MHz.

The VREC coupled signal results from coupling between the two conductor pairs under test. Such coupling typically occurs in or proximate to connectors 18 (see FIG. 1). As such, VREC is measured at the same end of cable 12 where VREF is transmitted. Receiver 28 employs well known methodologies to receive VREC and down-convert it into a signal having an intermediate frequency (indicated by f'). Receiver 28 obtains the VREC signal from switch matrix 30 and an amplifier 46 amplifies VREC. The output of amplifier 46 is coupled to a mixer 48. Mixer 48 also receives a mixing signal from frequency generator 34. The mixing signal produced by frequency generator 34 has a frequency that is offset from the output signal frequency (indicated by f+f'). The mixing signal and the output signal are maintained in synchronization by frequency generator 34. In the preferred embodiment f' equals 450 kHz.

The output of mixer 48 is coupled to a narrowband intermediate frequency (IF) filter 50. In the preferred embodiment, filter 50 has a bandwidth of approximately 12 kHz with −50 dB side skirts. Filter 50 is configured to reject frequency components unrelated to the down-converted intermediate signal, i.e., filter 50 reduces the detection of noise and interference that may be present on the receiving conductor pair. For example, if VREF is transmitted at 2.00 MHz and the mixing signal has a frequency of 2.45 MHz, then the output of mixer 48 includes a series of frequency components related to sums and differences of the 2.00 MHz and the 2.45 MHz frequencies. Filter 50 removes all of the sum and difference frequencies except for f=2.45 MHz−2.00 MHz=450 kHz.

The output of filter 50 is coupled to a log detector 52. Log detector 52 generates a logarithmic output signal for further processing by circuit 24. For example, control circuit 32 may calculate the NEXT for the current test conditions by evaluating the following relationship:

$$\text{NEXT (dB)}=\text{LOG(VREC)}-\text{LOG(VREF)}.$$

Switch matrix 30 can create a short between the two conductor pairs under test to obtain a 0 dB reference measurement. Of course, the output from log detector 52 and/or the processed NEXT measurements can be further processed or formatted for purposes of display, memory storage, or printing.

To reduce the test time associated with conventional NEXT measurement equipment, apparatus 10 tests both ends of cable 12 approximately simultaneously. FIG. 2 depicts a NEXT measurement at first end 14 between conductor pair 36 and conductor pair 38, and a simultaneous NEXT measurement at second end 16 between conductor pair 40 and conductor pair 42. For purposes of the following description, VREF1 is generated by a first transmitter 26a, VREF2 is generated by a second transmitter 26b, VREC1 is received by a first receiver 28a, and VREC2 is received by a second receiver 28b. The various conductor pairs are typically terminated in their specified characteristic impedances (indicated by $Z_0$ in FIG. 2). In addition, the output/input impedances of transmitters 26 and receivers 28 may be configured to approximate the specified characteristic impedances of the associated conductor pairs.

In the preferred embodiment, switching matrices 30 are controlled such that only one signal (transmitted or received) is carried on any given conductor pair. This configuration takes advantage of the inherent isolation between distinct conductor pairs and reduces the amount of noise and interference received by receivers 28. Those skilled in the art will appreciate that the present invention is not limited to transmitting and/or receiving only one signal per conductor pair and that apparatus 10 may be alternatively configured to transmit two test signals on one conductor pair while receiving two respective coupled signals on a second conductor pair. In addition, apparatus 10 may employ multiple transmitters and/or receivers in master module 20, remote module 22, or both. Such use of multiple transmitters or receivers may be desirable to enable apparatus 10 to simultaneously test any number of conductor pairs at either end of cable 12.

Simultaneous testing at both ends of cable 12 is accomplished by establishing and maintaining a frequency offset between the test signal transmitted from first end 14 and the concurrent test signal transmitted from second end 16. The frequency offset ensures that the frequency of a test signal transmitted from first end 14 does not mix into the narrow intermediate frequency band associated with receiver 28b located at second end 16 (see FIG. 2). Similarly, a test signal transmitted from second end 16 is not detected by receiver 28a located at first end.

Furthermore, the offset is selected such that excessive amounts of harmonic frequency components of the test signals are not erroneously detected as coupled signals. In other words, the offset frequency is selected to reduce interference in VREC1 caused by VREF2 and to reduce interference in VREC2 caused by VREF1. In an ideal scenario, harmonic components of VREF2 would not be detected by first receiver 28a, and harmonic components of VREF1 would not be detected by second receiver 28b. The frequency offset between first and second transmitters 26a and 26b, along with the narrow bandwidth of filter 50, enables receivers 28 to adequately reject signals not caused by near end coupling.

Figure 4:
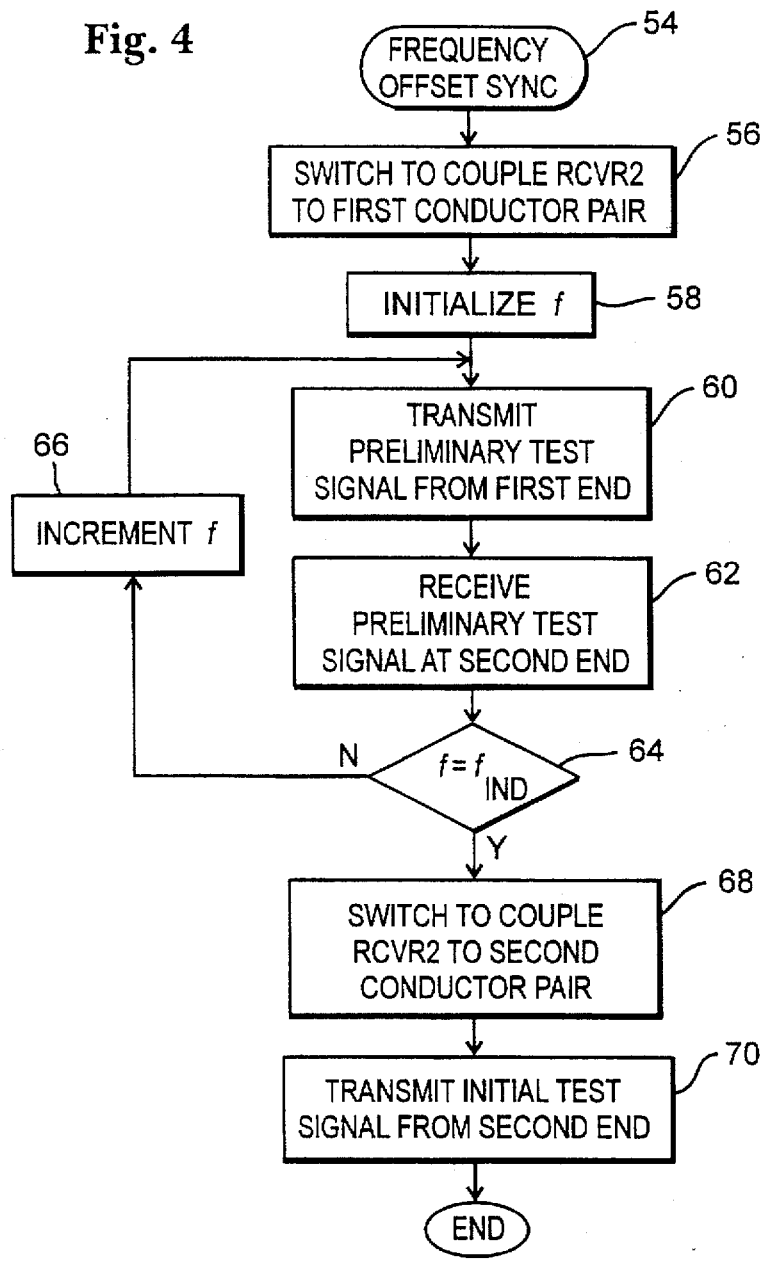
FIG. 4 is a flow diagram of a frequency offset synchronization process performed by the NEXT measurement apparatus.

Prior to conducting a NEXT measurement, cable 12 is coupled between master module 20 and remote module 22, each of which includes a receptacle or plug configured to mate with connectors 18. FIG. 4 is a flow diagram of a frequency offset synchronization process 54 performed by apparatus 10 to establish the frequency offset between master module 20 and remote module 22. Process 54 is preferably performed at the beginning of a NEXT measurement for each combination of two conductor pairs. For convenience, the exemplary test conditions depicted in FIG. 2 will be referred to in the following description of process 54.

Process 54 begins with a task 56, which causes switch matrix 30 at remote module 22 to couple second receiver 28b to first conductor pair 36. This configuration, rather than the configuration shown in FIG. 2, is desirable to enable second receiver 28b to directly receive signals transmitted by first transmitter 26a rather than receive a weak coupled signal on a different conductor pair. After task 56, a task 58 initializes the transmit frequency of first transmitter 26a. In the preferred embodiment, the transmit frequency begins at 1 MHz.

After the transmit frequency is initialized in task 58, a task 60 causes first transmitter 26a to transmit a preliminary test signal from first end 14. "Preliminary" is used herein to describe the test signals that are transmitted before the desired frequency offset has been established. The preliminary test signal is transmitted on first conductor pair 36. During a task 62, which may actually occur concurrently with task 60, second receiver 28b receives the preliminary test signal at second end 16.

Although not shown in FIG. 4, while tasks 60 and 62 are being performed the NEXT between first conductor pair 36 and second conductor pair 38 is measured at first end 14. In other words, the NEXT measurement at first end 14 may be performed independently for a short time prior to establishing the frequency offset. During tasks 60 and 62, second transmitter 26b refrains from transmitting test signals.

After task 62 is performed, a query task 64 is initiated. Query task 64 is performed to detect whether the frequency of the current preliminary test signal is equal to a predetermined indicator frequency ($f_{IND}$). Task 64 may be performed independently at master and remote test modules 20 and 22. Frequency generator 34 (see FIG. 3) in second receiver 28b may be instructed to produce the appropriate mixing signal such that second receiver 28b is tuned to the indicator frequency during task 64. Of course, this tuning of second receiver 28b may be performed at any time prior to query task 64, e.g., during task 56 or task 58. The indicator frequency is known at master test module 20 because control unit 32 causes frequency generator 34 to produce it.

In the preferred embodiment the indicator frequency is approximately 1.9 MHz, which establishes a frequency offset of roughly 1 MHz between first and second transmitters 26a and 26b. The 1 MHz offset results because the following test signal transmitted from master module 20 has a frequency of about 2 MHz while the initial test signal concurrently transmitted from remote module 22 has a frequency of about 1 MHz. While other frequency offsets will work acceptably well, this roughly 1 MHz offset is desirable because it is small enough to minimize interference from harmonics and large enough to fall far outside the bandwidth of IF filter 50 (see FIG. 3).

If query task 64 determines that the current frequency does not equal the predetermined indicator frequency, then a task 66 is performed. Task 66 causes frequency generator 34 of first transmitter 26a to increment the frequency of the preliminary test signal. However, remote module 22 continues to monitor first conductor pair 36 for a signal having the indicator frequency. Process 54 is reentered at task 60 following task 66. Consequently, tasks 60, 62, 64, and 66 are repeated for a plurality of preliminary test signals until query task 64 causes both master module 20 and remote module 22 to determine that the current frequency equals the predetermined indicator frequency. Apparatus 10 may employ timing and/or interrupt routines that regulate how long each of the preliminary test signals are transmitted.

During task 66, remote module 22 may ignore extraneous signals present on first conducting element 36 to reduce erroneous detection of the indicator frequency. In the preferred embodiment, the preliminary test signal having the indicator frequency is transmitted from first transmitter 26a for a relatively longer duration than other test signals. For example, if no other test signal is transmitted for longer than 8 milliseconds, then the indicator signal may be transmitted for 10 milliseconds. During query task 64, control unit 32 of remote module 22 may be programmed to ignore the detection of signals having the indicator frequency if those signals are not detected for more than 9 milliseconds. Thus, a relatively short detection of the indicator frequency present in noise, interference, or harmonic components of other signals will not be erroneously interpreted as the true indicator signal. Those skilled in the art should appreciate that other noise filtering methodologies can be implemented to achieve equivalent results.

If query task 64 determines that the current preliminary test signal is being transmitted at the indicator frequency, then a task 68 is prompted. Task 68 causes switch matrix 30 at remote module 22 to couple second receiver 28b to fourth conductor pair 42 (as depicted in FIG. 2). In addition, task 68 electronically reconfigures second receiver 28b for detection of VREC2 signals, e.g., the mixing signal may be reset to an initial frequency, such as 1.45 MHz, rather than that required for detection of the indicator frequency. After task 68, a task 70 controls switch matrix 30 so that second transmitter 26b will transmit its initial test signal on third conductor pair 40. At this time, simultaneous NEXT testing begins at both ends of cable 12. After task 70 is performed and master module 20 and remote module 22 are synchronized, process 54 ends.

In the preferred embodiment, the initial test signal transmitted from second end 16 is transmitted at the same frequency as the first preliminary test signal transmitted in task 60. The test signal frequencies at both ends 14 and 16 increase at substantially the same rate. As such, the predetermined frequency offset is preferably defined by the difference between the indicator frequency and the transmit frequency of the initial test signal and remains substantially constant during simultaneous NEXT testing.

After transmitting the indicator signal, first transmitter 26a may pause to allow for the switching and reconfiguration of second receiver 28b at remote module 22. Timing and interrupt routines may prompt first transmitter 26a to resume transmission of test signals from first end 14 while second transmitter 26b transmits the initial test signal from second end 16. The timing and interrupt routines may also ensure that the frequency offset is maintained during the simultaneous transmission of the respective test signals.

Figure 5:
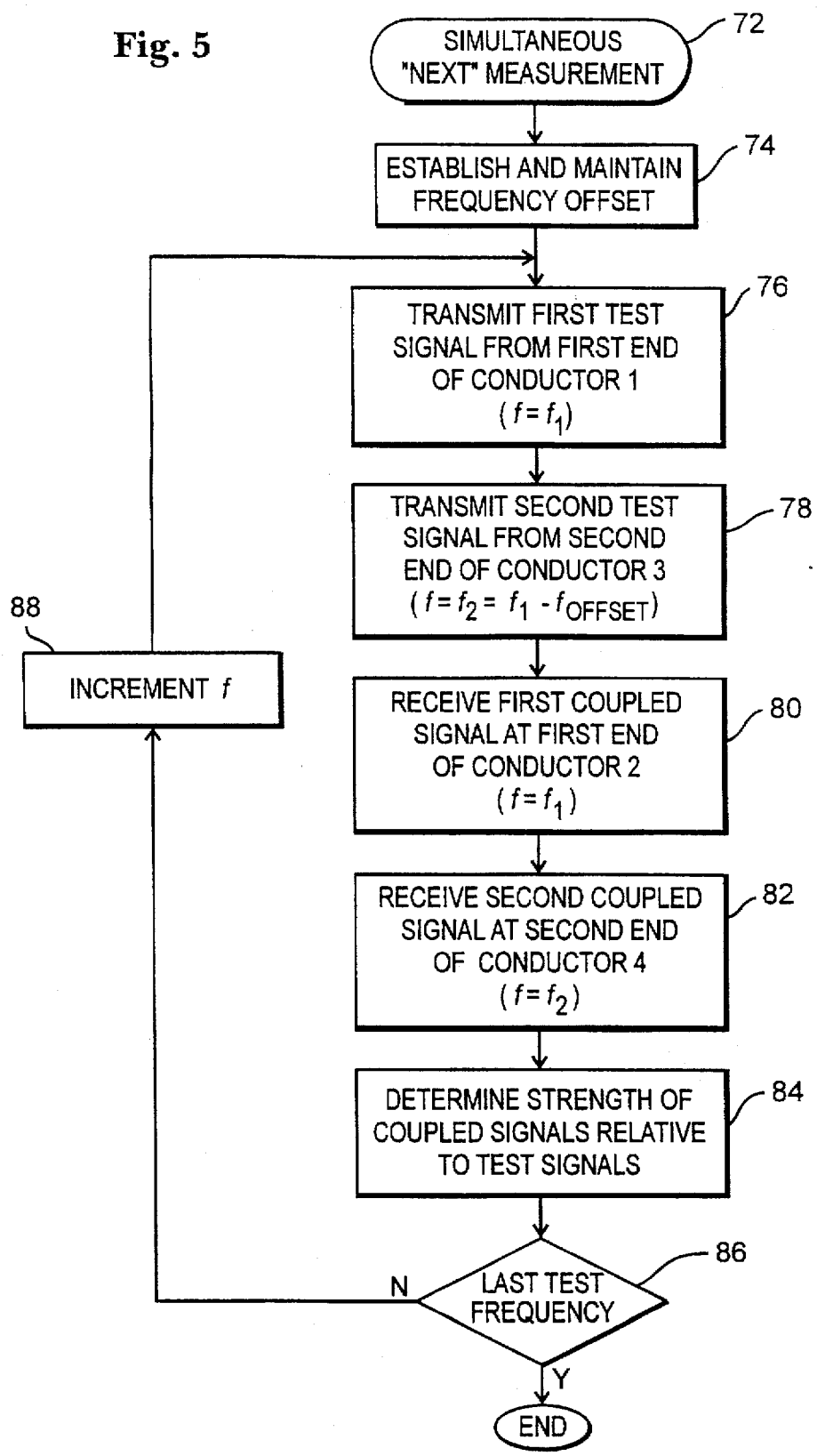
FIG. 5 is a flow diagram of a simultaneous NEXT measurement process performed by the NEXT measurement apparatus.

FIG. 5 is a flow diagram of a simultaneous NEXT measurement process 72 performed by apparatus 10. As discussed above, apparatus 10 may repeat process 72 for different combinations of two conductor pairs. The test conditions shown in FIG. 2 will again be referred to for purposes of the following description. Process 72 begins with a task 74, which establishes and maintains a predetermined frequency offset between a first test signal (VREF1) and a second test signal (VREF2). Task 74 may be carried out by process 54, described above. In addition to task 74, a task 76 is performed.

Task 76 causes first transmitter 26a to transmit VREF1 on first conductor pair 36. VREF1 is transmitted from first end 14, and it has a first frequency f1 associated with it. A task 78 causes second transmitter 26b to transmit VREF2 on third conductor pair 40. VREF2 is transmitted from second end 16, and it has a second frequency f2 associated with it. As described above in connection with process 54, f2 differs from f1 by a predetermined frequency offset (f2=f1−$f_{OFFSET}$). In the preferred embodiment, tasks 76 and 78 are performed approximately simultaneously.

A task 80 receives a first coupled signal (VREC1) on second conductor pair 38. Task 80 may be performed concurrently with tasks 76 and 78. Receiver 28a (described above in connection with FIG. 3) performs task 80. VREC1, which has first frequency f1, is produced as a result of near end coupling (at first end 14) between first and second conductor pairs 36 and 38. A task 82, which occurs approximately simultaneously with tasks 76, 78, and 80, receives a second coupled signal (VREC2) on fourth conductor pair 42. VREC2, which has second frequency f2, is produced as a result of near end coupling at second end 16 between third and fourth conductor pairs 40 and 42.

The narrowband nature of filters 50 (see FIG. 3) and the predetermined frequency offset between VREF1 and VREF2 reduce the likelihood that frequency components of VREF1 and VREF2 will be erroneously detected as NEXT by second receiver 28b and first receiver 28a, respectively. In other words, first and second receivers 28a and 28b are configured to reject frequency components associated with VREF2 and VREF1, respectively. As such, apparatus 10 is capable of conducting NEXT measurements simultaneously from both ends of cable 12.

Following tasks 76, 78, 80 and 82, a task 84 determines the strength of the coupled signals relative to the respective test signals. As described above in connection with FIG. 3, NEXT is typically calculated according to the following relationship:

$$NEXT\ (dB)=LOG(VREC)-LOG(VREF).$$

The calculated values of NEXT can be stored in memory (not shown in FIG. 3) located at master and remote modules 20 and 22. Such values may be further processed for presentation to a user upon completion of testing.

After task 84, a query task 86 tests whether the current frequency is the last test frequency for the conductor pairs under test. If query task 86 determines that additional test frequencies remain, then a task 88 increments first frequency f1 and second frequency f2. Task 88 is performed at approximately the same time for frequency generators 34 located at both master module 20 and remote module 22. As discussed previously, timing and interrupt routines are preferably employed to maintain the predetermined frequency offset between VREF1 and VREF2. The incremental frequency steps and test frequency range may be preprogrammed into control units 32 according to the specific testing application. After task 88 increments the testing frequencies, process 72 is reentered at task 76 to repeat the simultaneous NEXT measurement for the new frequencies.

If, however, query task 86 determines that no additional test frequencies remain, then process 72 ends. As a result of the frequency offset between first and second transmitters 26a and 26b, remote module 22 may operate independently for a short time after the final test frequency is generated by first transmitter 26a. Notwithstanding the short periods of independent operation prior to frequency offset synchronization and after completion of testing at master module 20, apparatus 10 completes the NEXT measurements at both ends of cable 12 in less time than conventional NEXT measurement equipment.

In summary the present invention provides an improved apparatus for measuring NEXT in a multiconductor cable. The NEXT measurement apparatus is capable of simultaneously conducting NEXT measurements from both ends of a data communications cable, which reduces the testing time associated with current NEXT testing equipment.

The above description is of a preferred embodiment of the present invention, and the invention is not limited to the specific embodiment described and illustrated. For example, the present invention is not restricted to use with Category 5 cable or unshielded twisted pair cable, and the test conditions described herein are used only for illustrative purposes. In addition, the processes described herein may include additional tasks or may perform the described tasks in a modified order. Furthermore, many variations and modifications will be evident to those skilled in this art, and such variations and modifications are intended to be included within the spirit and scope of the invention, as expressed in the following claims.

What is claimed is:

1. A method for measuring near end cross talk (NEXT) between a plurality of conductor pairs in a multiconductor cable, said method comprising the steps of:

(a) transmitting a first test signal on a first one of said conductor pairs, said first test signal being transmitted at a first frequency;

(b) transmitting a second test signal on a second one of said conductor pairs, said second test signal being transmitted at a second frequency;

(c) receiving a first coupled signal in response to said step (a), said first coupled signal having said first frequency and being received over a third one of said conductor pairs; and (d) receiving a second coupled signal in response to said step (b), said second coupled signal having said second frequency and being received over a fourth one of said conductor pairs; wherein said steps (a) and (b) occur approximately simultaneously.

2. A method according to claim 1, wherein said cable has first and second ends, said first coupled signal is received proximate said first end during said step (c), and said second coupled signal is received proximate said second end during said step (d).

3. A method according to claim 1, wherein said cable has first and second ends, said first test signal is transmitted from said first end, and said second test signal is transmitted from said second end.

4. A method according to claim 1, wherein said steps (c) and (d) occur approximately simultaneously.

5. A method according to claim 1, wherein:

said first and second frequencies differ by a predetermined offset frequency; and said offset frequency is selected to reduce interference in said first coupled signal caused by said second test signal and to reduce interference in said second coupled signal caused by said first test signal.

6. A method according to claim 1, wherein:

said step (c) further comprises the step of rejecting frequency components associated with said second test signal; and said step (d) further comprises the step of rejecting frequency components associated with said first test signal.

7. A method according to claim 1, further comprising the steps of:

determining the strength of said first coupled signal relative to said first test signal; and determining the strength of said second coupled signal relative to said second test signal.

8. A method for measuring near end cross talk (NEXT) between a plurality of conductor pairs in a multiconductor cable having first and second ends, said method comprising the steps of:

(a) establishing a predetermined frequency offset between a first test signal and a second test signal;

(b) transmitting said first test signal on a first one of said conductor pairs and said second test signal on a second one of said conductor pairs;

(c) receiving a first coupled signal, responsive to said first test signal, at said first end of a third one of said conductor pairs; and (d) receiving a second coupled signal, responsive to said second test signal, at said second end of a fourth one of said conductor pairs, said first and second coupled signals being received approximately simultaneously at said first and second ends, respectively.

9. A method according to claim 8, wherein:

said first test signal and said first coupled signal have a first frequency; and said second test signal and said second coupled signal have a second frequency.

10. A method according to claim 8, wherein said first and second test signals are transmitted approximately simultaneously from said first and second ends, respectively, during said step (b).

11. A method for measuring near end cross talk (NEXT) between a plurality of conducting elements in a multiconductor cable having first and second ends, said method comprising the steps of:

(a) establishing a predetermined frequency offset between a first test signal and a second test signal by:

transmitting, from said first end, a plurality of preliminary test signals on a first one of said conducting elements;

receiving, at said second end, said preliminary test signals on said first conducting element;

detecting when one of said preliminary test signals is transmitted at an indicator frequency; and transmitting an initial test signal from said second end in response to said detecting step, said initial test signal being transmitted on one of said conducting elements;

(b) transmitting said first test signal on one of said conducting elements and said second test signal on one of said conducting elements; and (c) receiving a first coupled signal, responsive to said first test signal, at said first end and a second coupled signal, responsive to said second test signal, at said second end, said first and second coupled signals being received approximately simultaneously at said first and second ends, respectively.

12. A method according to claim 11, wherein said initial test signal is transmitted on a second one of said conducting elements.

13. A method according to claim 11, wherein:

said preliminary test signals receiving step is performed by a receiver coupled to said first conducting element; and said method further comprises the step of switching to couple said receiver to a second one of said conductor elements in response to said detecting step.

14. A method according to claim 11, wherein said predetermined frequency offset is defined by the difference between said indicator frequency and the transmit frequency of said initial test signal.

15. A method according to claim 11, wherein said detecting step comprises the step of ignoring, at said second end, extraneous signals present on said first conducting element, said extraneous signals having said indicator frequency.

16. An apparatus for measuring near end cross talk (NEXT) between a plurality of conductor pairs in a multiconductor cable having first and second ends, said apparatus comprising:

a first transmitter configured to transmit a first test signal at a first frequency from said first end on a first one of said conductor pairs;

a second transmitter configured to transmit a second test signal at a second frequency from said second end on a second one of said conductor pairs;

a first receiver configured to receive a first coupled signal at said first end from a third one of said conductor pairs, said first coupled signal having said first frequency; and a second receiver configured to receive a second coupled signal at said second end from a fourth one of said conductor pairs, said second coupled signal having said second frequency; wherein said first and second receivers are adapted to receive said first and second coupled signals approximately simultaneously.

17. An apparatus according to claim 16, wherein said first and second transmitters are adapted to transmit said first and second test signals approximately simultaneously.

18. An apparatus according to claim 16, further comprising means for establishing a predetermined frequency offset between said first and second test signals.

19. An apparatus according to claim 16, wherein:

said first receiver is configured to reject frequency components associated with said second test signal; and said second receiver is configured to reject frequency components associated with said first test signal.

20. An apparatus according to claim 16, wherein:

said first transmitter and said first receiver are located in a first module;

said second transmitter and said second receiver are located in a second module; and said first and second modules are adapted such that said cable couples therebetween during a NEXT measurement.

\* \* \* \* \*